US009392159B2

(12) United States Patent
Kawai

(10) Patent No.: US 9,392,159 B2
(45) Date of Patent: Jul. 12, 2016

(54) FOCUS ESTIMATING DEVICE, IMAGING DEVICE, AND STORAGE MEDIUM STORING IMAGE PROCESSING PROGRAM

(71) Applicant: NIKON CORPORATION, Tokyo (JP)

(72) Inventor: Atsushi Kawai, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/186,575

(22) Filed: Feb. 21, 2014

(65) Prior Publication Data

US 2014/0232927 A1    Aug. 21, 2014

Related U.S. Application Data

(63) Continuation of application No. PCT/JP2012/005539, filed on Aug. 31, 2012.

(30) Foreign Application Priority Data

Sep. 2, 2011   (JP) ................. 2011-191555

(51) Int. Cl.
| | |
|---|---|
| H04N 5/232 | (2006.01) |
| G03B 13/00 | (2006.01) |
| G02B 7/36 | (2006.01) |
| G03B 13/36 | (2006.01) |
| H04N 9/04 | (2006.01) |

(52) U.S. Cl.
CPC ............ *H04N 5/23212* (2013.01); *G02B 7/36* (2013.01); *G03B 13/36* (2013.01); *H04N 9/045* (2013.01)

(58) Field of Classification Search
CPC . H04N 5/23212; H04N 5/2621; G03B 13/36; G02B 7/28; G02B 7/36; G02B 7/365; G02B 7/38

USPC .......... 348/345, 348–349, 351–353
See application file for complete search history.

(56) References Cited

U.S. PATENT DOCUMENTS

| | | |
|---|---|---|
| 5,192,998 A | 3/1993 | Tokumitsu et al. |
| 5,212,516 A | 5/1993 | Yamada et al. |
| 5,376,991 A | 12/1994 | Kaneda et al. |
| 5,742,892 A | 4/1998 | Chaddha |
| 6,091,862 A | 7/2000 | Okisu |

(Continued)

FOREIGN PATENT DOCUMENTS

| | | |
|---|---|---|
| CN | 1487728 A | 4/2004 |
| EP | 0 335 656 A1 | 10/1989 |

(Continued)

OTHER PUBLICATIONS

Dec. 4, 2012 Search Report issued in International Patent Application No. PCT/JP2012/005539 (with translation).

(Continued)

*Primary Examiner* — Kelly L Jerabek
(74) *Attorney, Agent, or Firm* — Oliff PLC

(57) ABSTRACT

A focus estimating device has an area setting unit which sets an area in which focusing of an image is determined and divides the area into a plurality of blocks, a block selecting unit which selects a block to be used for focus determination, a block focus determination unit which performs focus determination for each block from an edge in each color component of the block selected by the block selecting unit, and a focus determination unit which determines focusing of the area based on the focus determination.

38 Claims, 8 Drawing Sheets

(56) References Cited

U.S. PATENT DOCUMENTS

| | | |
|---|---|---|
| 2002/0135683 A1 | 9/2002 | Tamama et al. |
| 2003/0020819 A1 | 1/2003 | Fukuda |
| 2003/0099044 A1 | 5/2003 | Fujii |
| 2004/0165090 A1 | 8/2004 | Ning |
| 2006/0078217 A1 | 4/2006 | Poon et al. |
| 2007/0116375 A1 | 5/2007 | Utsugi et al. |
| 2008/0174678 A1* | 7/2008 | Solomon .................. 348/231.99 |
| 2009/0102963 A1 | 4/2009 | Yeo et al. |
| 2009/0208114 A1 | 8/2009 | Tanaka et al. |
| 2010/0128144 A1 | 5/2010 | Tay |
| 2010/0202683 A1* | 8/2010 | Robinson ...................... 382/164 |
| 2010/0315521 A1 | 12/2010 | Kunishige et al. |
| 2011/0141344 A1* | 6/2011 | Abe .............................. 348/345 |
| 2011/0150349 A1* | 6/2011 | Kojima et al. ................ 382/224 |
| 2011/0199534 A1 | 8/2011 | Kawai |

FOREIGN PATENT DOCUMENTS

| | | |
|---|---|---|
| JP | A 3-136012 | 6/1991 |
| JP | A 3-204277 | 9/1991 |
| JP | A 6-138362 | 5/1994 |
| JP | A 6-153054 | 5/1994 |
| JP | A 9-139940 | 5/1997 |
| JP | A 10-164602 | 6/1998 |
| JP | A 2000-165892 | 6/2000 |
| JP | A 2000-299874 | 10/2000 |
| JP | A 2002-214513 | 7/2002 |
| JP | A 2003-15026 | 1/2003 |
| JP | A 2003-46876 | 2/2003 |
| JP | 2004-157456 A | 6/2004 |
| JP | 2004-219461 A | 8/2004 |
| JP | 2005-156597 A | 6/2005 |
| JP | A 2008-42937 | 2/2008 |
| JP | A 2009-103800 | 5/2009 |
| JP | 2009-199232 A | 9/2009 |
| JP | A 2010-286752 | 12/2010 |
| JP | A 2011-107682 | 6/2011 |
| JP | A 2011-154194 | 8/2011 |

OTHER PUBLICATIONS

Mar. 4, 2014 International Preliminary Report on Patentability issued in International Patent Application No. PCT/JP2012/005539 (with translation).
U.S. Appl. No. 12/987,437, filed Jan. 10, 2011.
Jun. 6, 2013 Office Action issued in U.S. Appl. No. 12/987,437.
Apr. 7, 2014 Office Action issued in U.S. Appl. No. 12/987,437.
Jun. 27, 2011 Search Report issued in European Patent Application No. 11150773.7.
Dec. 20, 2011 Office Action issued in Japanese Patent Application No. 2010-004218 (with translation).
Apr. 17, 2012 Office Action issued in Japanese Patent Application No. 2010-274725 (with translation).
Apr. 17, 2012 Office Action issued in Japanese Patent Application No. 2010-274724 (with translation).
Jul. 31, 2012 Office Action issued in European Patent Application No. 11 150 773.7.
Nov. 20, 2012 Office Action issued in Japanese Patent Application No. 2010-274725 (with translation).
Sep. 20, 2013 Search Report issued in European Patent Application No. 11 150 773.7-1562.
Dec. 19, 2014 Office Action issued in European Application No. 11150773.7.
Oct. 10, 2014 Office Action issued in Chinese Application No. 201110008088.8.
Jun. 3, 2015 Office Action issued in Chinese Patent Application No. 201280042875.7.
Dec. 14, 2015 Office Action issued in Chinese Patent Application No. 201280042875.7.
Mar. 15, 2016 Office Action issued in Japanese Patent Application No. 2012-191152.

* cited by examiner

FOCUS ESTIMATING AREA

COLOR IMAGE

DETERMINATION RESULT : FRONT FOCUS

FOCUS ESTIMATING AREA

COLOR IMAGE

FOCUS ESTIMATING DEVICE, IMAGING DEVICE, AND STORAGE MEDIUM STORING IMAGE PROCESSING PROGRAM

CROSS REFERENCE TO RELATED APPLICATION

This application is a continuation application of international Application No. PCT/JP2012/005539, filed on Aug. 31, 2012, designating the U.S., in which the International Application claims a priority date of Sep. 2, 2011, based on prior filed Japanese Patent Application No. 2011-191555, the entire contents of which are incorporated herein by reference.

BACKGROUND

1. Field

The present application relates to a focus estimating device, an imaging device, and a storage medium storing an image processing program.

2. Description of the Related Art

An autofocus device which detects a focal position deviation of a lens by using chromatic aberration of light and modifies blur of each color light by performing focusing based on a detection result has been known (see Japanese Unexamined Patent Application Publication No. H06-138362 as an example).

However, the prior-art autofocus device cannot detect in what direction in an optical axis direction a lens position is deviated with respect to a focusing position, and determination accuracy of a focus state is low.

SUMMARY

A focus estimating device which is an aspect of the present invention has an area setting unit which sets an area in which focusing of an image is determined and divides the area into a plurality of blocks, a block selecting unit which selects a block to be used for focus determination, a block focus determination unit which performs focus determination for each block from an edge in each color component of the block selected by the block selecting unit, and a focus determination unit which determines focusing of the area based on the focus determination.

An imaging device which is an aspect of the present invention has an imaging unit and the focus estimating device of the above described one aspect.

A non-transitory computer readable storage medium which is an aspect of the present invention stores an image processing computer program causing a computer to execute the processing of setting an area in which focusing of an image is determined, dividing the area into a plurality of blocks, selecting a block to be used for focus determination, performing focus determination for each block from an edge in each color component of the selected block, and determining focusing of the area based on the focus determination.

A focus estimating device which is another aspect of the present invention has an area setting unit which sets an area in which focusing of an image is determined and divides the area into a plurality of blocks, a block selecting unit which selects the block including an edge, a block focus determination unit which performs focus determination of each block from the edge in each color component of the block selected by the block selecting unit, and a focus determination unit which determines focusing of the area based on the focus determination.

An imaging device which is another aspect of the present invention has an imaging unit and the focus estimating device of the above described another aspect.

A non-transitory computer readable storage medium which is another aspect of the present invention stores an image processing computer program causing a computer to execute the processing of setting an area in which focusing of an image is determined, dividing the area into a plurality of blocks, selecting a block including an edge, performing focus determination for each block from the edge in each color component of the selected block, and determining focusing of the area based on the focus determination.

DETAILED DESCRIPTION OF THE EMBODIMENTS

Explanation of First Embodiment

Figure 1:
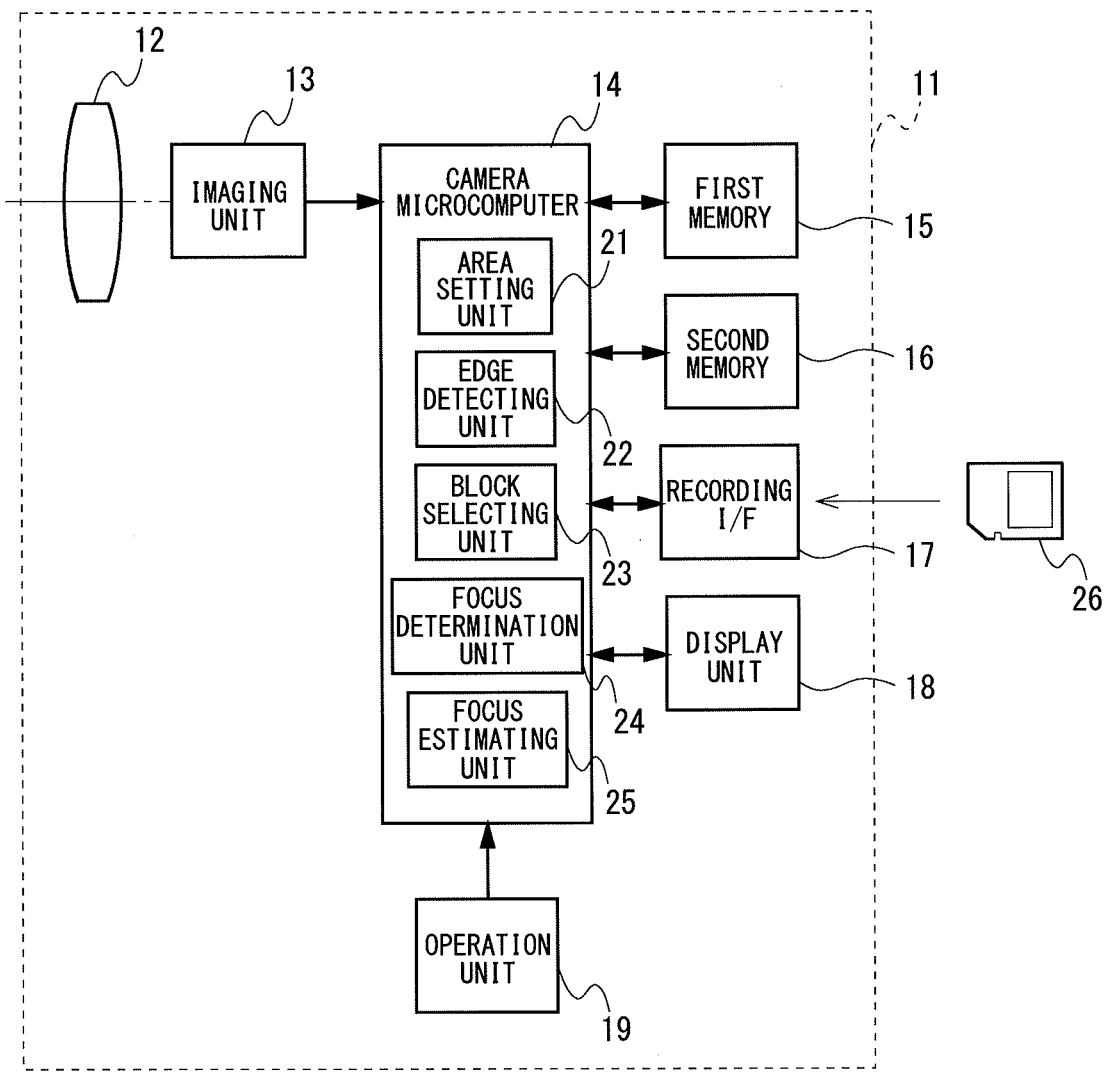
FIG. 1 is a diagram illustrating a configuration example of an electronic camera of a first embodiment.

FIG. 1 is a diagram illustrating a configuration example of an electronic camera of a first embodiment which is an example of a focus estimating device and an imaging device.

An electronic camera 11 includes a photographing optical system 12, an imaging unit 13, a camera microcomputer 14, a first memory 15, a second memory 16, a recording I/F 17, a display unit 18, and an operation unit 19. The imaging unit 13, the first memory 15, the second memory 16, the recording I/F 17, the display unit 18, and the operation unit 19 are connected to the camera microcomputer 14, respectively.

The photographing optical system 12 has a plurality of lenses including a focusing lens for AF (AutoFocus) and a zoom lens. In FIG. 1, the photographing optical system 12 is expressed by a single lens for simplification. The photographing optical system 12 may be replaceable with respect to a main body of the electronic camera 11.

The imaging unit 13 is a module for imaging (photographing) a subject image formed by the photographing optical system 12. For example, the imaging unit 13 includes an image sensor performing photoelectric conversion, an analog frontend circuit performing analog signal processing, and a digital frontend circuit performing A/D conversion and digital signal processing. The imaging unit 13 outputs an image signal acquired by imaging to the camera microcomputer 14.

Here, in each of pixels of the image sensor of the imaging unit 13, red (R), green (G), and blue (B) color filters are arranged in accordance with known Bayer array. Thus, each pixel of the image sensor outputs an image signal corresponding to the respective color by color separation using the color filters. As a result, the imaging unit 13 can acquire color images at the time of imaging.

Moreover, in a photographing mode of the electronic camera 11, the imaging unit 13 photographs a still image for recording involving recording in a non-volatile recording medium in accordance with a photographing instruction by a user. Moreover, the imaging unit 13 photographs an image for observation (a through image) at predetermined intervals even during photographing standby for a still image.

The camera microcomputer 14 is a processor for integrally controlling an operation of the electronic camera 11. For example, in the photographing mode, the camera microcomputer 14 causes the imaging unit 13 to photograph a still image for recording in accordance with the photographing instruction by the user. Moreover, the camera microcomputer 14 applies image processing such as color interpolation processing, white balance correction, gradation conversion, color conversion, contour enhancement processing and the like to data of the image acquired from the imaging unit 13.

Moreover, the camera microcomputer 14 functions, by executing a program, as an area setting unit 21, an edge detecting unit 22, a block selecting unit 23, a focus determination unit 24, and a focus estimating unit 25 (operations of the area setting unit 21, the edge detecting unit 22, the block selecting unit 23, the focus determination unit 24, and the focus estimating unit 25 will be described later).

The first memory 15 is a memory for temporarily storing data of the image and includes an SDRAM which is a volatile recording medium, for example. Moreover, the second memory 16 is a memory for storing a program executed by the camera microcomputer 14 and various types of data and includes a non-volatile memory such as a flash memory, for example.

The recording I/F 17 has a connector for connecting a non-volatile recording medium 26. The recording I/F 17 executes writing/reading of data of the image with respect to the recording medium 26 connected to the connector. The above described recording medium 26 is a hard disk and a memory card incorporating a semiconductor memory, for example. FIG. 1 illustrates a memory card as an example of the recording medium 26.

The display unit 18 is a display device (such as a liquid crystal monitor, an organic EL monitor and the like) displaying various images. For example, the display unit 18 performs moving image display (viewfinder display) of a through image or reproduction display of a still image by control of the camera microcomputer 14.

The operation unit 19 includes a plurality of switches (a power button, a release button, a zoom button, a cross key, a determination button, a reproduction button, a deletion button and the like, for example) for receiving various operations of the user.

An example of an AF operation of the electronic camera in the first embodiment will be described.

In the present embodiment, when an input of a through image from the imaging unit 13 is started, the camera microcomputer 14 executes AF processing and continuously performs focusing during display of the through image. As a result, the electronic camera 11 performs AF control during display of the through image all the time.

If a frame acquired from the imaging unit 13 is a color image expressed by an RGB colorimetric system, a focusing position on an optical axis of each color component is different due to a difference in axial chromatic aberration in each color component of the RGB. Paying attention to a point that a size relationship of a blur width w is reversed before and after the focusing position on the optical axis in each color component in an edge area, it is known that the current focus state can be determined based on a difference in the blur width w ($\Delta$w) of the edge between two colors. Thus, by determining in what direction in an optical axis direction the current position of the AF lens is shifted from the focusing position, the electronic camera 11 can execute AF control.

Here, when an optical system or an image sensor of a general electronic camera is to be used, the above described blur width of each color component has a range of several to several tens of pixels, while a difference in the blur width between two colors is only approximately a tenth or a hundredth thereof. That is, since the difference in the blur width is small with respect to a measurement error of the blur width that can be measured only by the unit of a pixel, it is difficult to directly acquire the difference $\Delta$w of the blur width with accuracy from the measurement result of the blur width. Thus, the electronic camera of the present embodiment determines the focus state by the following method.

Figure 2:
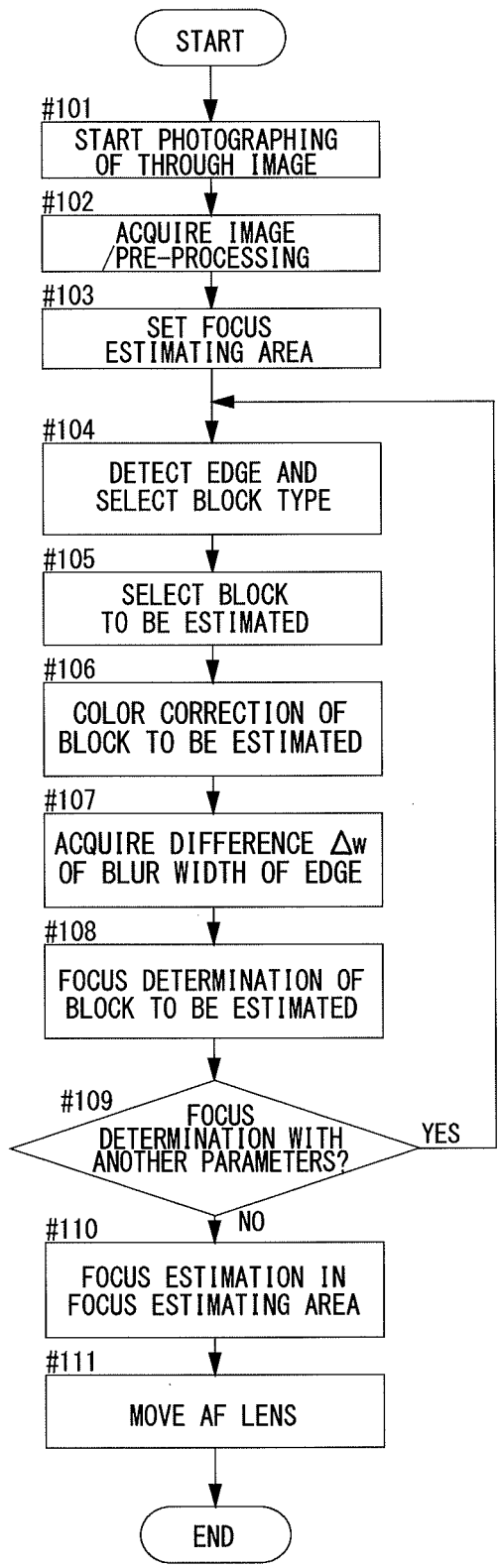
FIG. 2 is a flowchart illustrating an example of an AF operation of the electronic camera in the first embodiment.

FIG. 2 is a flowchart illustrating an example of the AF operation of the electronic camera in the first embodiment. The processing in FIG. 2 is started by the camera microcomputer 14 in accordance with start of the photographing mode.

Here, in the explanation in FIG. 2, on an assumption that there is axial chromatic aberration between R and G, an example of acquiring a difference $\Delta w_{R-G}$ of the blur width in color difference R-G will be mainly described. It is assumed that $\Delta w_{R-G}$ calculated from the color difference R-G is a positive value on a front focus side and a negative value on a rear focus side. If a positive/negative relationship is reversed between the front focus and the rear focus, it is only necessary to use $\Delta w_{G-R}$ calculated from the color difference G-R. It is needless to say that the determination can be made in the same method also between R and B or G and B.

Step #101: the camera microcomputer 14 starts photographing of the through image by driving the imaging unit 13. Subsequently, the through image is sequentially generated at predetermined intervals.

Moreover, the camera microcomputer 14 in the photographing mode causes the display unit 18 to perform moving image display of the through image. Therefore, the user can perform framing for determining a photographing composition by referring to the through image on the display unit 18.

Step #102: the camera microcomputer 14 acquires a color image (through image) to be processed from the imaging unit 13. Then, the camera microcomputer 14 executes pre-processing for the color image to be processed such as smoothing processing for noise reduction and resolution correction for correcting direction dependence of the edge. The camera microcomputer 14 may partially apply the pre-processing at #102 only to a focus estimating area, to be described later, in the color image to be processed.

In the present specification, RGB pixel values in a coordinate (x, y) of a color image are expressed as R(x, y), G(x, y), and B(x, y), respectively.

Figure 3:
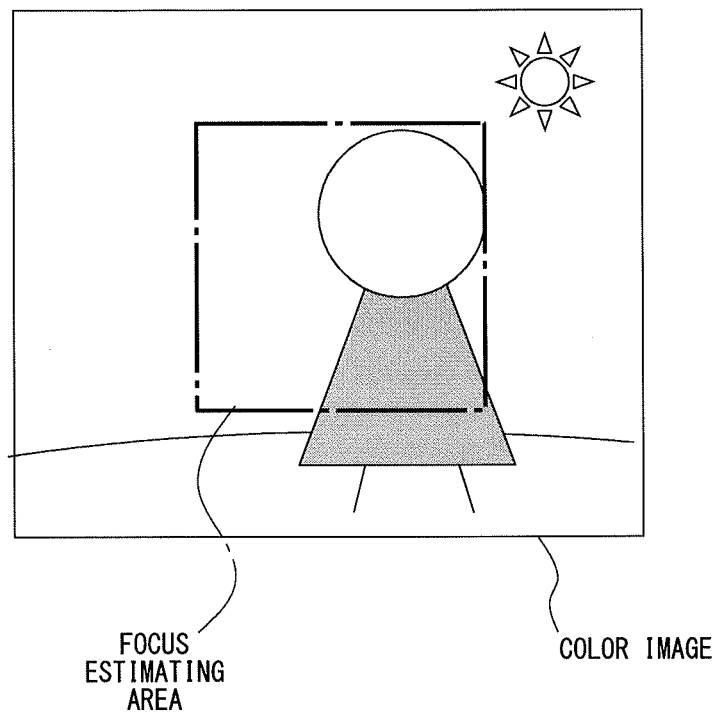
FIG. 3 is a diagram illustrating a setting example of a focus estimating area.

Step #103: The area setting unit 21 sets an area (focus estimating area) for which focus estimation is made in a part of the color image to be processed. The focus estimating area is divided into areas in a lattice state by rectangular blocks. As an example, an image size of each block is the number of pixels of BLOCK_SIZE×BLOCK_SIZE (8×8 pixels, for example). FIG. 3 illustrates a setting example of the focus estimating area.

Step #104: The edge detecting unit 22 detects an edge (a gradient component of an image) of each color component of a pixel for each block. Then, the edge detecting unit 22 sorts the blocks by type in accordance with a gradient amount of the pixel in the block.

Here, assuming that a coordinate of the block is (u, v), a set BL of the pixels included in the block (u, v) of interest can be expressed by an equation (1):

$$x1=u\times BLOCK\_SIZE, x2=(u+1)\times BLOCK\_SIZE-1$$

$$y1=v\times BLOCK\_SIZE, y2=(v+1)\times BLOCK\_SIZE-1$$

$$BL=\{(x,y)|x1\le x\le x2 \cap y1\le y\le y2\} \quad (1)$$

Moreover, a horizontal gradient (dxR(x, y)) and a vertical gradient (dyR(x, y)) of an R component in each pixel and a horizontal gradient (dxG(x, y)) and a vertical gradient (dyG(x, y)) of a G component in each pixel can be acquired by an equation (2):

$$dxR(x,y)=(R(x+1,y)-R(x-1,y))/2$$

$$dyR(x,y)=(R(x,y+1)-R(x,y-1))/2$$

$$dxG(x,y)=(G(x+1,y)-G(x-1,y))/2$$

$$dyG(x,y)=(G(x,y+1)-G(x,y-1))/2 \quad (2)$$

Moreover, average values ($R_{Block}(u, v)$, $G_{Block}(u, v)$) of the R and G pixels in the block and its horizontal gradient sum ($dxR_{Block}(u, v)$, $dxG_{Block}(u, v)$) as well as vertical gradient sum ($dyR_{Block}(u, v)$, $dyG_{Block}(u, v)$) can be acquired by an equation (3):

$$R_{Block}(u, v) = \left[\sum_{(x,y)\in BL} R(x, y)\right]/(BLOCK\_SIZE)^2 \quad (3)$$

$$G_{Block}(u, v) = \left[\sum_{(x,y)\in BL} G(x, y)\right]/(BLOCK\_SIZE)^2$$

$$dxR_{Block}(u, v) = \sum_{(x,y)\in BL} dxR(x, y)$$

$$dyR_{Block}(u, v) = \sum_{(x,y)\in BL} dyR(x, y)$$

$$dxG_{Block}(u, v) = \sum_{(x,y)\in BL} dxG(x, y)$$

$$dyG_{Block}(u, v) = \sum_{(x,y)\in BL} dyG(x, y)$$

Figure 8A:
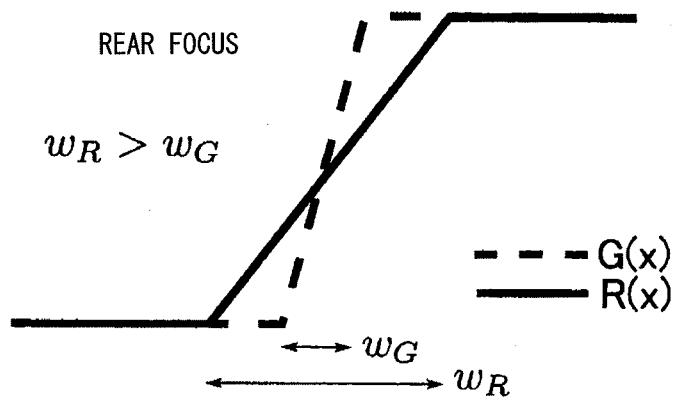
FIGS. 8A to 8C are diagrams illustrating an outline of focus determination.
Figure 8B:
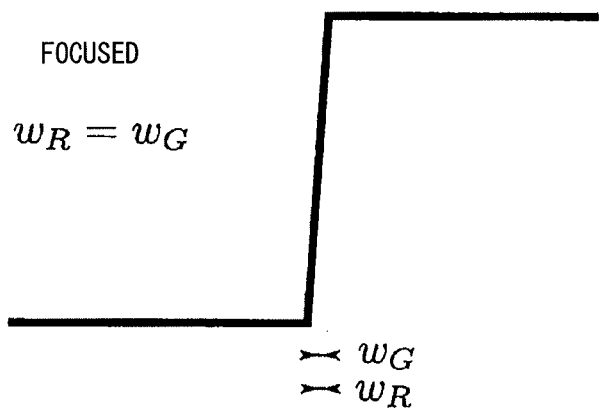
Figure 8C:
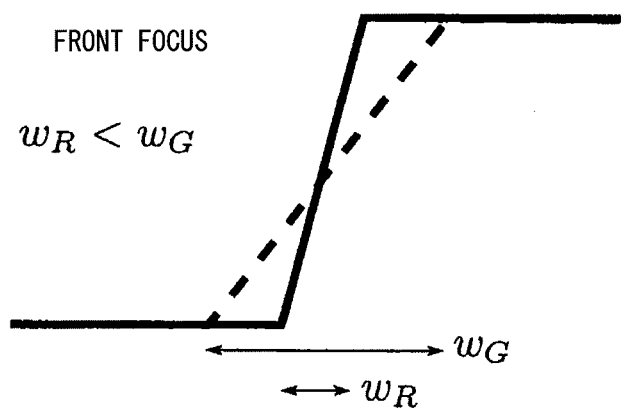

Moreover, in order to determine front or rear focus by axial chromatic aberration, edge gradients need to be inclined in the same direction between two colors to be compared (see FIGS. 8A to 8C). This condition is satisfied if a relationship in an equation (4) is true in the horizontal direction and the vertical direction, respectively, for the gradient sums of each block.

$$dxR(x,y)\times dxG(x,y)\ge 0$$

$$dyR(x,y)\times dyG(x,y)\ge 0 \quad (4)$$

As an example, at #104, it is only necessary for the edge detecting unit 22 to execute processing of (A1) to (A5) below for each block and to sort the blocks in the focus estimating area by type.

(A1) The edge detecting unit 22 extracts a set of pixels ($HGP_{R-G}$) having gradients in the same direction in two colors in the horizontal direction at a threshold value TH_GRADPIXEL or more in the block of interest by an equation (5). Then, the edge detecting unit 22 acquires the number of elements of $HGP_{R-G}$ ($nHGradPixel_{R-G}(u, v)$) by an equation (6). In the present specification, a value of TH_GRADPIXEL is set so as to become larger than amplitude of a noise that can be included in the image in order to prevent misdetection of a noise.

$$HGP_{R\text{-}G} = \left\{(x, y) \middle| \begin{array}{l} (x, y) \in BL \cap dxR(x, y)\times dxG(x, y)\ge 0 \cap \\ dxR(x, y)\ge TH\_GRADPIXEL \cap \\ dxG(x, y)\ge TH\_GRADPIXEL \end{array}\right\} \quad (5)$$

$$nHGradPixel_{R\text{-}G}(u, v) = |HGP_{R\text{-}G}| \quad (6)$$

(A2) The edge detecting unit 22 extracts a set of pixels ($VGP_{R-G}$) having gradients in the same direction in two colors in the vertical direction at the threshold value TH_GRADPIXEL or more in the block of interest by an equation (7). Then, the edge extracting unit acquires the number of elements of $VGP_{R-G}$ ($nVGradPixel_{R-G}(u, v)$) by an equation (8).

$$VGP_{R\text{-}G} = \left\{(x, y) \middle| \begin{array}{l} (x, y) \in BL \cap dyR(x, y)\times dyG(x, y)\ge 0 \cap \\ dyR(x, y)\ge TH\_GRADPIXEL \cap \\ dyG(x, y)\ge TH\_GRADPIXEL \end{array}\right\} \quad (7)$$

$$nVGradPixel_{R\text{-}G}(u, v)|VGP_{R\text{-}G}| \quad (8)$$

(A3) The edge detecting unit 22 extracts a set of pixels ($FP_{R-G}$) having no gradient at the threshold value TH_FLATPIXEL or more in the block of interest by an equation (9). Then, the edge extracting unit acquires the number of elements of $FP_{R-G}$ ($nFlatPixel_{R-G}(u, v)$) by an equation (10). In the present specification, a value of TH_FLATPIXEL is set as appropriate within a range in which contrast can be considered to be substantially flat even if there is some amplitude of a pixel value.

$$FP_{R\text{-}G} = \left\{(x, y) \middle| \begin{array}{l} (x, y) \in BL \cap \\ dxR(x, y) < TH\_FLATPIXEL \cap \\ dxG(x, y) < TH\_FLATPIXEL \cap \\ dyR(x, y) < TH\_FLATPIXEL \cap \\ dyG(x, y) < TH\_FLATPIXEL \end{array}\right\} \quad (9)$$

$$nFlatPixel_{R\text{-}G}(u, v) = |FP_{R\text{-}G}| \quad (10)$$

(A4) The edge detecting unit 22 determines a block type of the block (u, v) of interest in accordance with the following conditions (i) to (iv):

(i) If the block (u, v) of interest satisfies an equation (11), the edge detecting unit 22 makes the block (u, v) of interest "horizontal edge block $HEBL_{R-G}$". In the present specification, "$N_{Pixel}$" refers to the total number of pixels of the block of interest ($N_{Pixel}=BLOCK\_SIZE^2$). Moreover, "RATIO_EDGEBLOCK" indicates a coefficient specifying a ratio of a content of the pixel with a gradient to all the pixels in the block.

$$HEBL_{R-G} = \left\{ (u, v) \middle| \begin{array}{l} nHGradPixel_{R-G}(u, v) \geq N_{Pixel} \times \text{RATIO\_EDGEBLOCK} \cap \\ nVGradPixel_{R-G}(u, v) < N_{Pixel} \times \text{RATIO\_EDGEBLOCK} \end{array} \right\} \quad (11)$$

That is, in the block (u, v) of interest, if a ratio of $nHGradPixel_{R-G}(u, v)$ to all the pixels in the block is at RATIO_EDGEBLOCK or more and if a ratio of $nVGradPixel_{R-G}(u, v)$ to all the pixels in the block is less than RATIO_EDGEBLOCK, the block type is determined to be the "horizontal edge block $HEBL_{R-G}$".

(ii) If the block (u, v) of interest satisfies an equation (12), the edge detecting unit 22 makes the block (u, v) of interest "vertical edge block $VEBL_{R-G}$".

$$VEBL_{R-G} = \left\{ (u, v) \middle| \begin{array}{l} nHGradPixel_{R-G}(u, v) < N_{Pixel} \times \text{RATIO\_EDGEBLOCK} \cap \\ nVGradPixel_{R-G}(u, v) \geq N_{Pixel} \times \text{RATIO\_EDGEBLOCK} \end{array} \right\} \quad (12)$$

That is, in the block (u, v) of interest, if a ratio of $nHGradPixel_{R-G}(u, v)$ to all the pixels in the block is less than RATIO_EDGEBLOCK and if a ratio of $nVGradPixel_{R-G}(u, v)$ to all the pixels in the block is at RATIO_EDGEBLOCK or more, the block type is determined to be the "vertical edge block $VEBL_{R-G}$".

(iii) If the block (u, v) of interest satisfies an equation (13), the edge detecting unit 22 makes the block (u, v) of interest "flat block $FBL_{R-G}$". "RATIO_FLATBLOCK" indicates a coefficient specifying a ratio of a content of the pixel without a gradient to all the pixels in the block.

$$FBL_{R-G} = \left\{ (u, v) \middle| \begin{array}{l} (u, v) \notin HEBL_{R-G} \cap (u, v) \notin VEBL_{R-G} \cap \\ nFlatPixel_{R-G}(u, v) \geq N_{Pixel} \times \text{RATIO\_FLATBLOCK} \end{array} \right\} \quad (13)$$

That is, if the block of interest does not belong to $HEBL_{R-G}$ or $VEBL_{R-G}$, and if the ratio of $nFlatPixel_{R-G}(u, v)$ to all the pixels in the block is at RATIO_FLATBLOCK or more, the block type is determined to be a "flat block $FBL_{R-G}$".

(iv) If the block (u, v) of interest does not fall under any one of the above described (i) to (iii), the edge detecting unit 22 excludes the block from a target for subsequent processing.

(A5) The edge detecting unit 22 changes the block of interest and executes processing of the above described (A1) to (A4). Then, the edge detecting unit 22 repeats the above described operation until the block types of all the blocks are determined.

Figure 4:
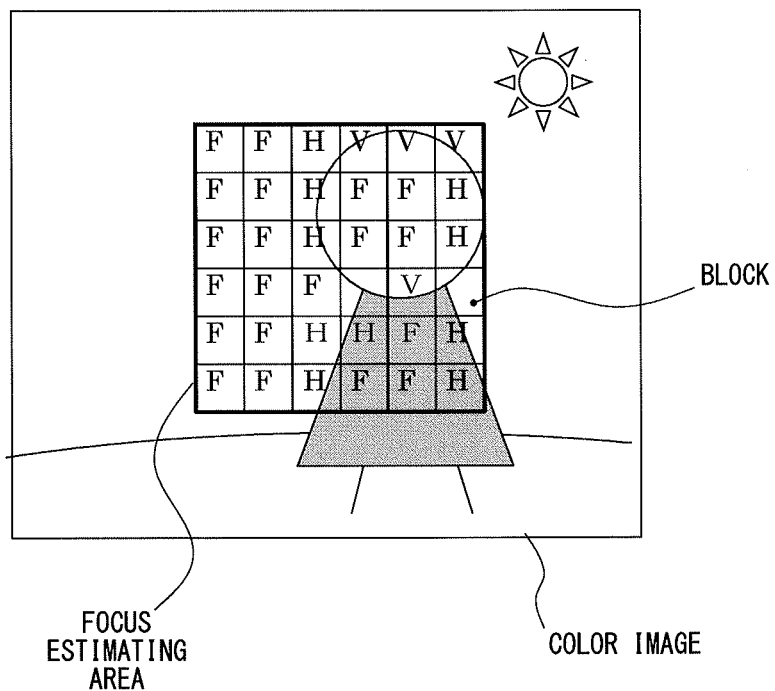
FIG. 4 is a diagram illustrating a determination example of a block type in a scene corresponding to FIG. 3.

FIG. 4 illustrates a determination example of the block type in a scene corresponding to FIG. 3. In this figure, "H" indicates a horizontal edge block, "V" indicates a vertical edge block, and "F" indicates a flat block.

Step #105: The block selecting unit 23 selects a block to be estimated to be applied to focus estimation in the edge blocks (horizontal edge block, vertical edge block) selected at #104. At this time, the block selecting unit 23 groups a plurality of the blocks to be estimated if an edge continues in the same direction between the adjacent blocks to be estimated. Hereinafter, the block to be estimated is also referred to as a continuous edge block in some cases.

As an example, a case of selection of the block to be estimated from the horizontal edge block will be described. The block selecting unit 23 groups the edge blocks which satisfy all of the following (condition 1) to (condition 5) and continue from the horizontal direction (u1, v) to (u2, v) in the horizontal edge blocks into one block to be estimated (continuous edge block).

Figure 5:
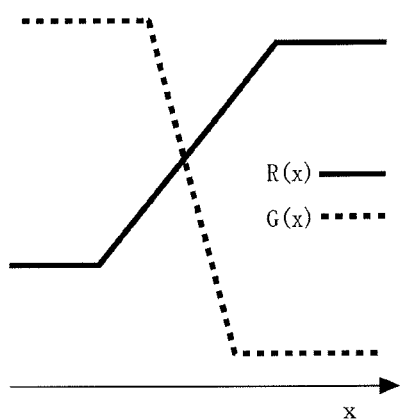
FIG. 5 is a diagram illustrating a case in which a gradient of an edge is inclined in opposite directions in two color components.

(Condition 1) The block selecting unit 23 selects the edge blocks having edge gradients inclined in the same direction for two color components having axial chromatic aberration as blocks to be estimated. That is because, for example, as illustrated in FIG. 5, if the edge gradients in two color components are inclined in opposite directions, detection of the difference in the blur width by the axial chromatic aberration becomes difficult. Specifically, it is only necessary for the horizontal edge block in the (condition 1) to satisfy the following equation (14):

$$(u1,v) \in HEBL_{R-G} \cap \ldots \cap (u2,v) \in HEBL_{R-G} \quad (14)$$

Figure 6A:
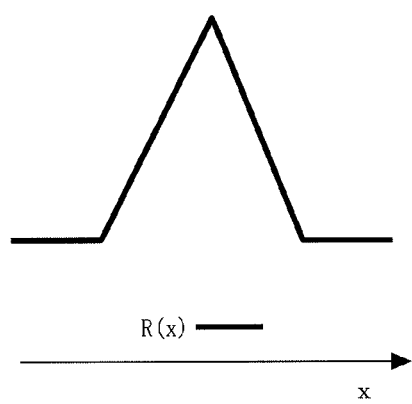
FIG. 6A is a diagram illustrating an example of a mountain-shaped structure.
Figure 6B:
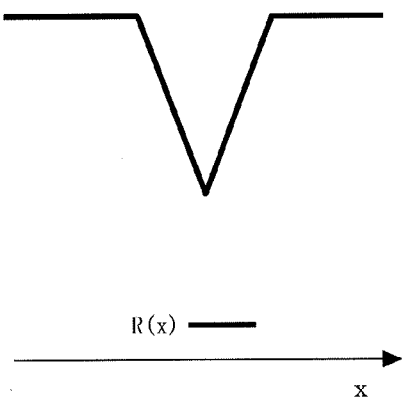
FIG. 6B is a diagram illustrating an example of a valley-shaped structure.

(Condition 2) The block selecting unit 23 selects the block to be estimated by excluding the block including an uneven structure (thin-line/mountain-shaped/valley-shaped structure) at the edge part. That is because, for example, color correction which will be described later cannot be made correctly for the mountain-shaped structure as in FIG. 6A or the valley-shaped structure as in FIG. 6B.

If the structure as above is included, a sum of the gradient absolute values and an absolute value of a gradient sum do not match each other. Thus, it is only necessary for the horizontal edge block in (condition 2) to satisfy the following equations (15) and (16):

$$\sum_{i=u1}^{u2} |dxR_{Block}(i, v)| - \left| \sum_{i=u1}^{u2} dxR_{Block}(i, v) \right| = 0 \quad (15)$$

$$\sum_{i=u1}^{u2} |dxG_{Block}(i, v)| - \left| \sum_{i=u1}^{u2} dxG_{Block}(i, v) \right| = 0 \quad (16)$$

(Condition 3) The block selecting unit 23 selects the horizontal edge block in which at least one of the blocks adjacent in a gradient direction (horizontal direction) of an edge is a flat block as the block to be estimated. That is because, if the above described condition is satisfied, color correction which will be described later can be made.

For example, in the horizontal edge blocks, it is only necessary that the two blocks (u1−1, v), (u2+1, v) adjacent in the horizontal direction of the continuous edge blocks are flat blocks. Thus, it is only necessary for the horizontal edge block in (condition 3) to satisfy the following equation (17):

$$(u1-1,v) \in FBL_{R-G} \cap (u2+1,v) \in FBL_{R-G} \quad (17)$$

(Condition 4) The block selecting unit 23 selects the block having a difference in contrast generated at the edge to be a threshold value TH_CONTRAST or more for both the two color components as the block to be estimated. That is because, if the contrast difference is small, detection of the blur width of the edge by the axial chromatic aberration becomes relatively difficult.

For example, it is only necessary for the horizontal edge block in (condition 4) to satisfy the following equation (18):

$$|R_{Block}(u1-1,v) - R_{Block}(u2+1,v)| \geq TH\_CONTRAST$$

$$|G_{Block}(u1-1,v) - G_{Block}(u2+1,v)| \geq TH\_CONTRAST \quad (18)$$

(Condition 5) The block selecting unit 23 selects the block having an edge length (length of the continuous edge blocks) less than a threshold value TH_LENGTH as the block to be estimated. The edge length is in inverse proportion to sharpness of the edge in general. Thus, by excluding the edge with too much blur or the edge which is not sharp, determination accuracy can be improved.

For example, it is only necessary for the horizontal edge block in (condition 5) to satisfy the following equation (19):

$$u2-u1 \leq TH\_LENGTH \quad (19)$$

Summarizing the above described (condition 1) to (condition 5), the condition which should be satisfied by the set $HEBS_{R-G}$ of the continuous edge blocks in the horizontal direction can be expressed by an equation (20). The continuous edge block at this time continues in the horizontal direction from (u1, v) to (u2, v). Moreover, the two blocks (u1−1, v) (u2+1, v) located in the horizontal direction of the continuous edge blocks are both flat blocks.

$$HEBS_{R-G} = \left\{(u1, u2, v) \middle| \begin{array}{l} (u1, v) \in HEBL_{R-G} \cap \ldots \cap (u2, v) \in HEBL_{R-G} \cap \\ \left|\sum_{i=u1}^{u2} |dxR_{Block}(i, v)| - \left|\sum_{i=u1}^{u2} dxR_{Block}(i, v)\right|\right| = 0 \cap \\ \left|\sum_{i=u1}^{u2} |dxG_{Block}(i, v)| - \left|\sum_{i=u1}^{u2} dxG_{Block}(i, v)\right|\right| = 0 \cap \\ (u1-1, v) \in FBL_{R-G} \cap (u2+1, v) \in FBL_{R-G} \cap \\ |R_{Block}(u1-1, v) - R_{Block}(u2+1, v)| \geq TH\_CONTRAST \cap \\ |G_{Block}(u1-1, v) - G_{Block}(u2+1, v)| \geq TH\_CONTRAST \cap \\ u2-1 \leq TH\_EB\_LENGTH \end{array}\right\} \quad (20)$$

Moreover, all of the above described (condition 1) to (condition 5) can be also applied to selection of the set $VEBS_{R-G}$ of the continuous edge blocks in the vertical direction. The condition which should be satisfied by the set $VEBS_{R-G}$ of the continuous edge blocks in the vertical direction can be expressed by an equation (21). The continuous edge blocks at this time continues in the vertical direction from (u, v1) to (u, v2). Moreover, the two blocks (u, v1−1) (u, v2+1) located in the vertical direction of the continuous edge blocks are both flat blocks.

$$VEBS_{R-G} = \left\{(u, v1, v2) \middle| \begin{array}{l} (u, v1) \in VEBL_{R-G} \cap \ldots \cap (u, v2) \in VEBL_{R-G} \cap \\ \left|\sum_{j=v1}^{v2} |dyR_{Block}(u, j)| - \left|\sum_{j=v1}^{v2} dyR_{Block}(u, j)\right|\right| = 0 \cap \\ \left|\sum_{j=v1}^{v2} |dyG_{Block}(u, j)| - \left|\sum_{j=v1}^{v2} dyG_{Block}(u, j)\right|\right| = 0 \cap \\ (u, v1-1) \in FBL_{R-G} \cap (u, v2+1) \in FBL_{R-G} \cap \\ |R_{Block}(u, v1-1) - R_{Block}(u, v2+1)| \geq TH\_CONTRAST \cap \\ |G_{Block}(u, v1-1) - G_{Block}(u, v2+1)| \geq TH\_CONTRAST \cap \\ v2-v1 \leq TH\_EB\_LENGTH \end{array}\right\} \quad (21)$$

Moreover, regarding the continuous edge blocks defined at #105, a set of pixels (x, y) in the continuous edge blocks is assumed to be P. At this time, P is expressed by an equation (22):

For the continuous edge blocks $(u1, u2, v) \in HEBS_{R-G}$ in the horizontal direction $$x1 = u1 \times BLOCK\_SIZE \quad x2 = (u2+1) \times BLOCK\_SIZE - 1$$

$$y1 = v \times BLOCK\_SIZE \quad y2 = (v+1) \times BLOCK\_SIZE - 1$$

For the continuous edge blocks $(u, v1, v2) \in VEBS_{R-G}$ in the vertical direction $$x1 = u \times BLOCK\_SIZE \quad x2 = (u+1) \times BLOCK\_SIZE - 1$$

$$y1 = v1 \times BLOCK\_SIZE \quad y2 = (v2+1) \times BLOCK\_SIZE - 1$$

$$P = \{(x,y) | x1 \leq x \leq x2 \cap y1 \leq y \leq y2\} \quad (22)$$

Figure 9:
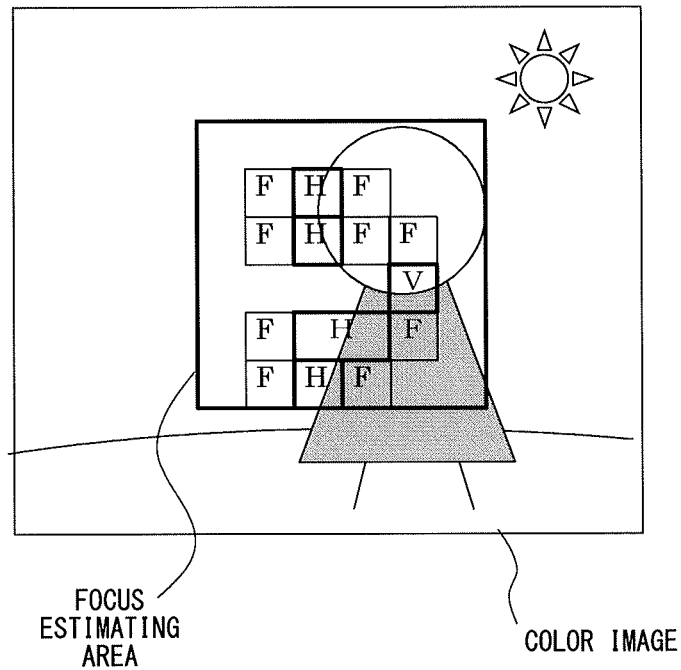
FIG. 9 is a diagram illustrating a selection example of a block to be estimated in a scene corresponding to FIG. 4.

A selection example of the block to be estimated in a scene corresponding to FIG. 4 is illustrated in FIG. 9. In the example in FIG. 9, an edge block selected as a block to be estimated is indicated by a bold line. In FIG. 9, a horizontal edge block (H) sandwiched in the horizontal direction by two flat blocks (F) and a vertical edge block (V) sandwiched in the vertical direction by two flat blocks (F) are the blocks to be estimated.

Step #106: The focus determination unit 24 applies color correction to each of the continuous edge blocks (blocks to be estimated) acquired at #105.

As an example, the focus determination unit 24 acquires $FL_R$ and $FL_G$ as well as $FH_R$ and $FH_G$ by the following equations (23) and (24) by using an average pixel value of two flat blocks adjacent in the gradient direction of the edge with respect to the continuous edge blocks. Here, "FL" indicates a flat block on a low contrast side and "FH" indicates a flat block on a high contrast side.

For the continuous edge blocks $HEBS_{R-G}$ in the horizontal direction $$G_{Block}(u1-1, v) < G_{Block}(u2+1, v) \rightarrow \quad (23)$$

$$\begin{cases} FL_R = R_{Block}(u1-1, v), FH_R = R_{Block}(u2+1, v) \\ FL_G = G_{Block}(u1-1, v), FH_G = G_{Block}(u2+1, v) \end{cases}$$

$$G_{Block}(u1-1, v) > G_{Block}(u2+1, v) \rightarrow$$

$$\begin{cases} FL_R = R_{Block}(u2+1, v), FH_R = R_{Block}(u1-1, v) \\ FL_G = G_{Block}(u2+1, v), FH_G = G_{Block}(u1-1, v) \end{cases}$$

For the continuous edge blocks $VEBS_{R-G}$ in the vertical direction $$G_{Block}(u, v1-1) < G_{Block}(u, v2+1) \rightarrow$$ (24)
$$\begin{cases} FL_R = R_{Block}(u, v1-1), FH_R = R_{Block}(u, v2+1) \\ FL_G = G_{Block}(u, v1-1), FH_G = G_{Block}(u, v2+1) \end{cases}$$

$$G_{Block}(u, v1-1) > G_{Block}(u, v2+1) \rightarrow$$
$$\begin{cases} FL_R = R_{Block}(u2+1, v), FH_R = R_{Block}(u, v1-1) \\ FL_G = G_{Block}(u2+1, v), FH_G = G_{Block}(u, v1-1) \end{cases}$$

Subsequently, the focus determination unit 24 determines primary coefficients ($a_{R0}$, $a_{R1}$, $a_{G0}$, $a_{G1}$) by an equation (25) so that $FL_R$, $FL_G$, and $FH_R$, $FH_G$ all become gray between CONT_L and CONT_H.

$$a_{R0} = \frac{CONT\_L \times FH_R - CONT\_H \times FL_R}{FH_R - FL_R}$$ (25)

$$a_{R1} = \frac{CONT\_H - CONT\_L}{FH_R - FL_R}$$

$$a_{G0} = \frac{CONT\_L \times FH_G - CONT\_H \times FL_G}{FH_G - FL_G}$$

$$a_{G1} = \frac{CONT\_H - CONT\_L}{FH_G - FL_G}$$

Then, the focus determination unit 24 normalizes pixel values $R(x, y)$ and $G(x, y)$ of a pixel (pixel of $(x, y) \in P$) in the continuous edge block by the following equations (26) and (27).

$$R'(x,y) = a_{R0} + a_{R1} \times R(x,y)$$ (26)

$$G'(x,y) = a_{G0} + a_{G1} \times G(x,y)$$ (27)

Figure 7A:
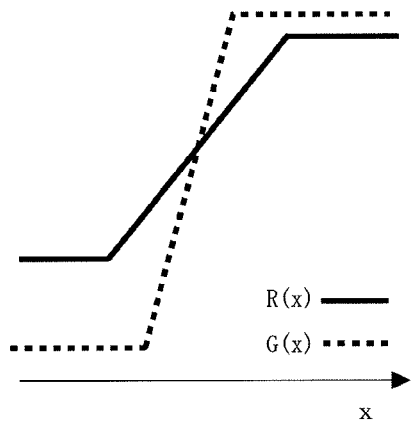
FIG. 7A is a diagram illustrating a state before color correction.
Figure 7B:
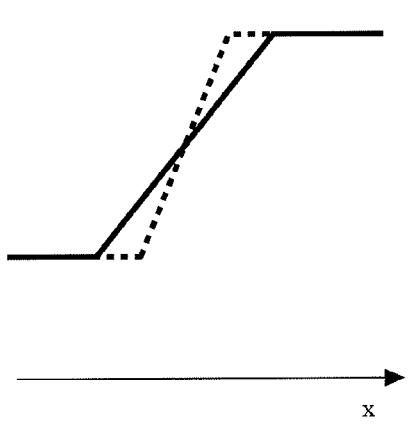
FIG. 7B is a diagram illustrating a state after the color correction.

FIGS. 7A and 7B are diagrams illustrating an outline of color correction at #106. For example, an edge R(x) of an R component indicated by a solid line and an edge G(x) of a G component indicated by a broken line in FIG. 7A are subjected to color correction so that a contrast difference on the both sides of an edge area becomes equal as illustrated in FIG. 7B.

Step #107: The focus determination unit 24 acquires the difference Δw of the blur width of the edge between two colors having axial chromatic aberration in each of the continuous edge blocks (blocks to be estimated), respectively, subjected to color correction at #106. As an example, the focus determination unit 24 may acquire Δw by the following method:

The focus determination unit 24 sorts pixel sets $E_R$, $E_G$ of an edge part having a gradient at a threshold value TH_EDGE or more from the pixel (pixel of $(x, y) \in P$) in the continuous edge block subjected to color correction by an equation (28).

$$E_R =$$ (28)
$$\left\{(x, y) \mid (x, y) \in P \cap \sqrt{dxR(x, y)^2 + dyR(x, y)^2} >= TH\_EDGE\right\}$$

$$E_G =$$
$$\left\{(x, y) \mid (x, y) \in P \cap \sqrt{dxG(x, y)^2 + dyG(x, y)^2} >= TH\_EDGE\right\}$$

Then, the focus determination unit 24 acquires an average value $Emean_R$ of an R pixel and an average value $Emean_G$ of a G pixel by an equation (29):

$$Emean_R = \frac{\sum_{(x,y) \in E_R} R(x, y)}{|E_R|}$$ (29)

$$Emean_G = \frac{\sum_{(x,y) \in E_G} G(x, y)}{|E_G|}$$

Here, the above described set $E_R$ can be sorted to a set $EL_R$ of pixel values each having $R(x, y)$ smaller than $Emean_R$ and a set $EH_R$ of pixel values each having $R(x, y)$ larger than $Emean_R$. Moreover, the above described set $E_G$ can be sorted to a set $EL_G$ of pixel values each having $G(x, y)$ smaller than $Emean_G$ and a set $EH_G$ of pixel values each having $G(x, y)$ larger than $Emean_G$ (equation (30)).

$$EL_R = \{(x,y) \mid R(x,y) <= Emean_R \cap (x,y) \in E_R\}$$

$$EH_R = \{(x,y) \mid R(x,y) >= Emean_R \cap (x,y) \in E_R\}$$

$$EL_G = \{(x,y) \mid G(x,y) <= Emean_R \cap (x,y) \in E_G\}$$

$$EH_G = \{(x,y) \mid G(x,y) >= Emean_G \cap (x,y) \in E_G\}$$ (30)

Moreover, a sum $EL_{R-G}$ of sets $EL_R$ and $EL_G$ and a sum $EH_{R-G}$ of sets $EH_R$ and $EH_G$ can be defined by an equation (31), respectively:

$$EL_{R-G} = EL_R \cup EL_G$$

$$EH_{R-G} = EH_R \cup EH_G$$ (31)

The focus determination unit 24 acquires a sum of color differences $\Delta AL_{R-G}$ and $\Delta AH_{R-G}$ respectively, for the pixels of the sets $EL_{R-G}$ and $EH_{R-G}$ by an equation (32). Then, the focus determination unit 24 acquires an index value $I_{R-G}$ by an equation (33):

$$\Delta AL_{R-G} = \sum_{(x,y) \in EL_{R-G}} (R(x, y) - G(x, y))$$ (32)

$$\Delta AH_{R-G} = \sum_{(x,y) \in EH_{R-G}} (R(x, y) - G(x, y))$$

$$I_{R-G} = \frac{4 \times (\Delta AL_{R-G} - \Delta AH_{R-G})}{CONT\_H - CONT\_L}$$ (33)

The above described index value $I_{R-G}$ forms a relationship of $I_{R-G} = \Delta w_{R-G} \times N_W$ for the difference $\Delta w_{R-G}$ in the blur width of the edge in two colors in the continuous edge blocks and the number of edges $N_W$ by the unit of pixel. Thus, the focus determination unit 24 can acquire $\Delta w_{R-G}$ by roughly calculating $N_W$.

Step #108: The focus determination unit 24 performs focus determination for each block to be estimated by using the difference Δw in the blur width of the edge between two colors.

In the present embodiment, $\Delta w_{R-G}$ calculated from the color difference R–G is a positive value on the front focus side and a negative value on the rear focus side. Thus, the focus determination at #108 is performed as follows, for example:

| | |
|---|---|
| $\Delta w_{R-G} > \Delta wAF_{R-G} + TH\_FOCUS1$ | REAR FOCUS |
| $\Delta wAF_{R-G} + TH\_FOCUS2 \le \Delta w_{R-G} \le \Delta wAF_{R-G} + TH\_FOCUS1$ | FOCUS |
| $\Delta w_{R-G} < \Delta wAF_{R-G} + TH\_FOCUS2$ | FRONT FOCUS |

Here, "$\Delta wAF_{R-G}$" is a reference value indicating a blur width at focusing. A value of $\Delta wAF_{R-G}$ is adjusted as appropriate by considering characteristics of axial chromatic aberration of the optical system, a color of the subject, a sectional shape of the edge, an interpolation method of the color image, AF means of the camera and the like. Moreover, "TH_FOCUS1, TH_FOCUS2" are parameters indicating blur allowable values on the rear focus side and the front focus side, respectively.

FIGS. 8A to 8C are diagrams illustrating an outline of the above described focus determination. For example, the edge R(x) of the R component and the edge G(x) of the G component after normalization by color correction will be considered.

Since R blurs more than G in rear focus, a relationship of wR>wG is formed between an edge length wR of the R component and an edge length wG of the G component as illustrated in FIG. 8A. Thus, if $\Delta w$ (=wR−wG) is larger than the threshold value TH_FOCUS1, the focus determination unit 24 determines it to be rear focus.

On the other hand, since G blurs more than R in front focus, a relationship of wR<wG is formed between an edge length wR of the R component and an edge length wG of the G component as illustrated in FIG. 8C. Thus, if $\Delta w$ (=wR−wG) is smaller than the threshold value TH_FOCUS2, the focus determination unit 24 determines it to be front focus.

At focusing, a relationship of wR=wG is formed between an edge length wR of the R component and an edge length wG of the G component in principle as illustrated in FIG. 8B. Thus, if $\Delta w$ (=wR−wG) is at the threshold value TH_FOCUS2 or more and at the threshold value TH_FOCUS 1 or less, the focus determination unit 24 determines that rear focus or front focus is not clear since the focus determination unit 24 is in the focus state.

Step #109: The camera microcomputer 14 determines whether or not focus determination will be further made by a different parameter.

If the above described requirement is satisfied (YES side), the camera microcomputer 14 performs focus determination with the processing similar to #104 to #108 for the other color components (B−G and R−B, for example). Alternatively, the camera microcomputer 14 may perform focus determination with the processing similar to #104 to #108 by changing the block size.

On the other hand, if the above described requirement is not satisfied (NO side), the camera microcomputer 14 proceeds to processing at #108.

Step #110: The focus estimating unit 25 integrates the focus determination results at each of the blocks to be estimated and estimates the focus state of the subject image in the focus estimating area.

The focus estimating unit 25 gives serial numbers with a suffix i to all the determination results ($N_{Result}$ pieces) for each setting of the color difference (R−G, B−G and the like), the gradient direction (vertical/horizontal and the like), and the block size for each of the blocks to be estimated (that is, the maximum value of i is the total number of the determination results). For total determination, the following value is substituted for the i-th determination result $A_i$:

$$A_i = \begin{cases} 1 & \text{(REAR FOCUS DETERMINATION)} \\ 0 & \text{(FOCUS DETERMINATION)} \\ -1 & \text{(FRONT FOCUS DETERMINATION)} \end{cases} (i = 1, 2 \ldots N_{Result})$$

The above described determination result $A_i$ is an example of a focus determination value and indicates a determination result of focusing at the block to be estimated.

Moreover, the focus estimating unit 25 at #110 may estimate the focus state of the subject image in the focus estimating area by applying weight-addition to at least either one of the focus determination result by a combination of the different color components and the focus determination result with different block sizes. Examples of (B1) to (B7) as an example of the weight-addition will be described below. The weight-addition illustrated below may be performed in combination as appropriate.

(B1): For example, the focus estimating unit 25 may multiply the result of focus determination between the color components with large axial chromatic aberration by a large weighting factor.

(B2): The larger the block size (that is, an area of an individual block) is, the relatively higher reliability of focus determination becomes. Therefore, the focus estimating unit 25 may increase the value of the weighting factor in proportion to the block size.

(B3): The larger the contrast difference of the edge included in the block is, the relatively higher reliability of focus determination becomes. Therefore, the focus estimating unit 25 may increase the value of the weighting factor in the block to be estimated as the contrast difference of the edge increases.

(B4): The smaller the blur width of the edge included in the block is, the edge is in a state close to the focusing, and reliability of focus determination becomes relatively high. Moreover, if a subject contour has smooth gradation, the blur width of the edge looks large, and reliability of focus determination becomes relatively low. Therefore, the focus estimating unit 25 may increase the value of the weighting factor in the block to be estimated as the apparent blur width of the edge decreases.

(B5): In accordance with a zoom position of the photographing optical system 12, a behavior of axial chromatic aberration changes, respectively. Therefore, the focus estimating unit 25 may determine the value of the weighting factor in the block to be estimated in accordance with the zoom position of the photographing optical system when a color image is acquired. At this time, a factor table indicating correspondence between the zoom position of the photographing optical system 12 and the weighting factor may be prepared in advance so that the focus estimating unit 25 reads the weighting factor from the factor table in accordance with the zoom position of the photographing optical system 12 and determines the weighting factor. If the electronic camera is a camera with interchangeable lenses, it is needless to say that the above described factor table is prepared for each of the interchangeable lenses.

(B6): When the difference in the blur width of the edge is to be acquired, if the edge was extracted from a part close to an achromatic color in at least one of the flat blocks adjacent on the both sides in the gradient direction, reliability of focus determination becomes relatively high. Therefore, the focus estimating unit 25 may increase the value of the weighting factor in the block to be estimated if a color difference in the two color components in the flat blocks adjacent in the gradient direction of the edge is lower than the threshold value.

(B7): For a moving subject, reliability of focus determination becomes relatively low. For example, when a motion vector of the subject is calculated by using a through image, the larger the motion vector of the subject in the block to be estimated is, the focus estimating unit 25 may decrease the value of the weighting factor in the block to be estimated.

When all the focus estimation results are handled equally, the weighting factor $\omega_i$ may be set to "1".

Then, the focus estimating unit 25 may acquire a comprehensive determination result of the block to be estimated by an equation (34) by using the total number $A_{OnFocus}$ of the blocks to be estimated which was determined to be focused and the weighted sum $A_{TotalResult}$ of the determination result. "TH_N_ONFOCUS" is a threshold value indicating a focus state, and "TH_REARFOCUS, TH_FRONTFOCUS" are threshold values indicating a rear focus state and a front focus state, respectively.

$$A_{OnFocus} = \{A_i \mid A_i = 0\} \ (i = 1, 2 \ldots N_{Result}) \ A_{TotalResult} = \sum_{i=0}^{N_{Result}} \omega i A_i \quad (34)$$

For $|A_{OnFocus}| \geq$ TH_N_ONFOCUS, FOCUS

For $|A_{OnFocus}| <$ TH_N_ONFOCUS $\cap$ $A_{TotalResult} \geq$ TH_REARFOCUS, REAR FOCUS For $|A_{OnFocus}| <$ TH_N_ONFOCUS $\cap$ $A_{TotalResult} \leq$ TH_FRONTFOCUS, FRONT FOCUS Subsequently, the focus estimating unit 25 determines the focus state of the whole focus estimating area by using the determination result of the above described block to be estimated. As an example, the focus estimating unit 25 may employ the determination result of the block to be estimated in the largest number in the focus estimation of the focus estimating area.

Figure 10:
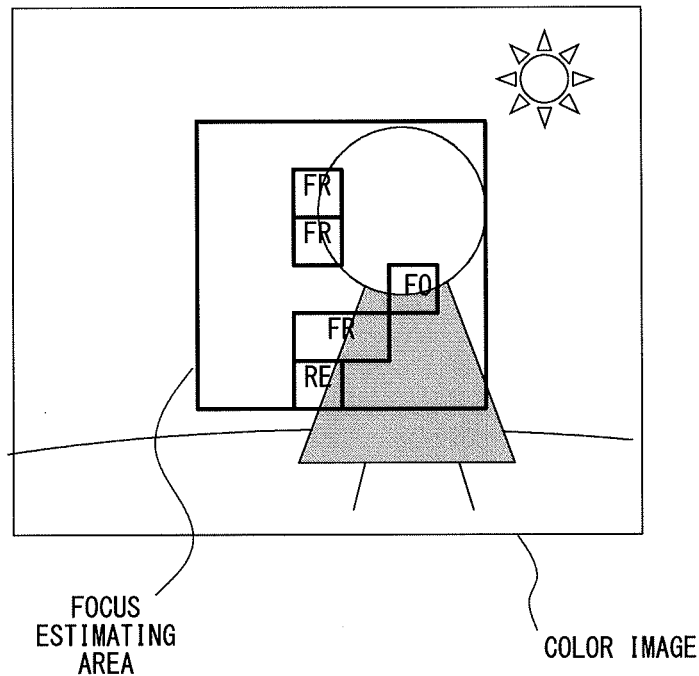
FIG. 10 is a diagram illustrating an example of focus estimation of the focus estimating area in a scene corresponding to FIG. 9.

FIG. 10 is a diagram illustrating an example of focus estimation in the focus estimating area in a scene corresponding to FIG. 9. In FIG. 10, the blocks to be estimated which were determined to be front focus, rear focus, and focused are noted as "FR", "RE", and "FO", respectively. In the example in FIG. 10, a ratio of rear focus: focused: front focus of the determination result of the block to be estimated (continuous edge block) in the focus estimating area is 1:1:3, and the entire focus estimating area is determined to be front focus.

Step #111: The camera microcomputer 14 moves the AF lens in a direction such that Δw gets closer to zero based on the determination result of the whole focus estimating area acquired at #110. Explanation of the processing in FIG. 2 ends here.

A working effect of the first embodiment will be described below.

The electronic camera 11 of the first embodiment sorts the block type based on the gradient amount of the pixel in the block in the focus estimating area of the color image (#104) and selects the block to be estimated to be applied to focus estimation (#105). The electronic camera 11 performs focus determination for a block to be estimated (#107, #108) by using the difference in the blur width (Δw) of the edge in the block to be estimated and determines the focus state of the focus estimating area by integrating the focus results (#110).

As a result, since the focus estimation for the entire focus estimating area can be made by accumulating the focus determination by the unit of individual blocks to be estimated, focus estimation with higher accuracy can be realized even if a focus state of the color image including edges in various colors/contrasts is estimated.

Moreover, in the electronic camera 11 in the first embodiment, when the edge continues in the same direction between the adjacent blocks to be estimated, a plurality of blocks to be estimated is grouped (#104). As a result, since the block to be estimated with a small area and the block to be estimated with a large area can be extracted from the focus estimating area at the same time in one session of processing, efficiency of calculation is improved.

<Variation 1>

At #104 in the above described embodiment, the edge detecting unit 22 may sort the block type by considering presence of the mountain/valley-shaped structure on a scale of the block size or less. In the variation 1, based on the idea similar to (Condition 2) at #105, it is only necessary for the edge detecting unit 22 to apply an equation (35) instead of the equation (11) in the determination of (i) at #104. Similarly, in the determination of (ii) at #104, it is only necessary for the edge detecting unit 22 to apply an equation (36) instead of the equation (12):

$$HEBL_{R-G} = \left\{ (u, v) \middle| \begin{array}{l} nHGradPixel_{R-G}(u, v) \geq N_{Pixel} \times \text{RATIO\_EDGEBLOCK} \cap \\ nVGradPixel_{R-G}(u, v) < N_{Pixel} \times \text{RATIO\_EDGEBLOCK} \cap \\ \sum_{(x,y) \in BL} |dxR(x, y)| - |dxR_{Block}(u, v)| = 0 \end{array} \right\} \quad (35)$$

$$VEBL_{R-G} = \left\{ (u, v) \middle| \begin{array}{l} nHGradPixel_{R-G}(u, v) < N_{Pixel} \times \text{RATIO\_EDGEBLOCK} \cap \\ nVGradPixel_{R-G}(u, v) \geq N_{Pixel} \times \text{RATIO\_EDGEBLOCK} \cap \\ \sum_{(x,y) \in BL} |dyR(x, y)| - |dyR_{Block}(u, v)| = 0 \end{array} \right\} \quad (36)$$

According to the above variation 1, since an area giving a bad influence on the focus determination by presence of an image structure having a block size or less can be eliminated in advance, determination accuracy can be improved.

<Variation 2>

At #110 of the above described embodiment, the focus estimating unit 25 may change the order of determination as appropriate.

As an example, the focus estimating unit 25 performs focus determination after applying weighted-averaging to the difference Δw of the blur width calculated by the unit of blocks to be estimated. Then, the focus estimating unit 25 sets a weight $\alpha_i$ of the determination result by using the difference in the blur width calculated for M pieces of the blocks to be estimated in the focus estimating area as $\Delta w_i$. In the variation 2, $\Delta w_i$ indicating the difference in blur width becomes a focus determination value.

Moreover, the weight of the determination result may be given by a length of a continuous edge block or a contrast difference between the adjacent flat blocks, or any one of the above described (B1) to (B7) described at #110 may be applied. When all the determination results are to be handled equally, $\alpha_i=1$ may be set.

An average ($\Delta w_{mean}$) of the difference in the blur width in the focus estimating area can be acquired by an equation (37):

$$\Delta w_{Mean} = \frac{\sum_{i=1}^{i<=M_{Result}} \alpha_i \Delta w_i}{\sum_{i=1}^{i<=M_{Result}} \alpha_i} \quad (37)$$

The focus estimating unit 25 may use the result of focus determination by comparison between the average $\Delta w_{mean}$ of the difference in the blur width and the threshold value as the determination result of the focus estimating area.

Explanation of Second Embodiment

Figure 11:
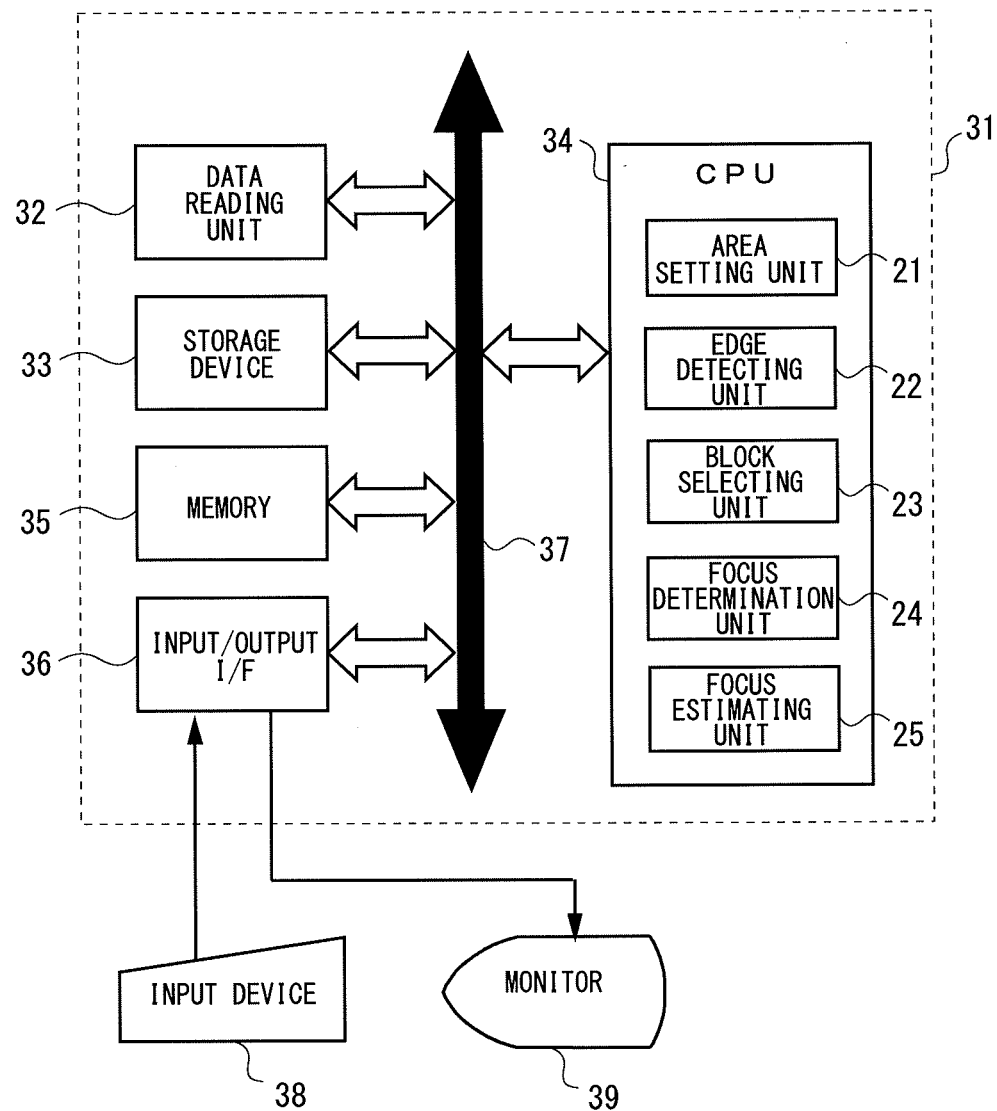
FIG. 11 is a diagram illustrating a configuration example of a focus estimating device of a second embodiment.

FIG. 11 is a diagram illustrating a configuration example of a focus estimating device of a second embodiment. The focus estimating device of the second embodiment is a personal computer in which an image estimating program is installed. In the example of the second embodiment, a color image photographed by the electronic camera is read by the focus estimating device, and the image is subjected to focus estimation in a post-processing process by the image estimating program.

A computer 31 illustrated in FIG. 11 has a data reading unit 32, a storage device 33, a CPU 34, a memory 35, an input/output I/F 36, and a bus 37. The data reading unit 32, the storage device 33, the CPU 34, the memory 35, and the input/output I/F 36 are connected to each other via the bus 37. Moreover, to the computer 31, an input device 38 (keyboard, pointing device and the like) and a monitor 39 are connected via the input/output I/F 36, respectively. The input/output I/F 36 receives various inputs from the input device 38 and also outputs data for display to the monitor 39.

The data reading unit 32 is used when image data or a program is read from the outside. For example, the data reading unit 32 is a reading device (reading devices of an optical disk, a magnetic disk, a magneto-optical disk and the like) for acquiring data from a detachable recording medium, a communication device (a USB interface, an LAN module, a wireless LAN module and the like) for conducting communication with an external device in compliance with a known communication standards. The data reading unit 32 of the second embodiment functions as an acquiring unit for acquiring a color image.

The storage device 33 includes a hard disk, a recording medium such as a non-volatile semiconductor memory, for example. This storage device 33 records an image processing program. The storage device 33 can also store image data read from the data reading unit 32 and the like.

The CPU 34 is a processor for integrally controlling each part of the computer 31. This CPU 34 operates as the area setting unit 21, the edge detecting unit 22, the block selecting unit 23, the focus determination unit 24, and the focus estimating unit 25 in the first embodiment by executing the image estimating program.

The memory 35 temporarily stores various calculation results by the image processing program. This memory 35 is a volatile SDRAM, for example.

Figure 12:
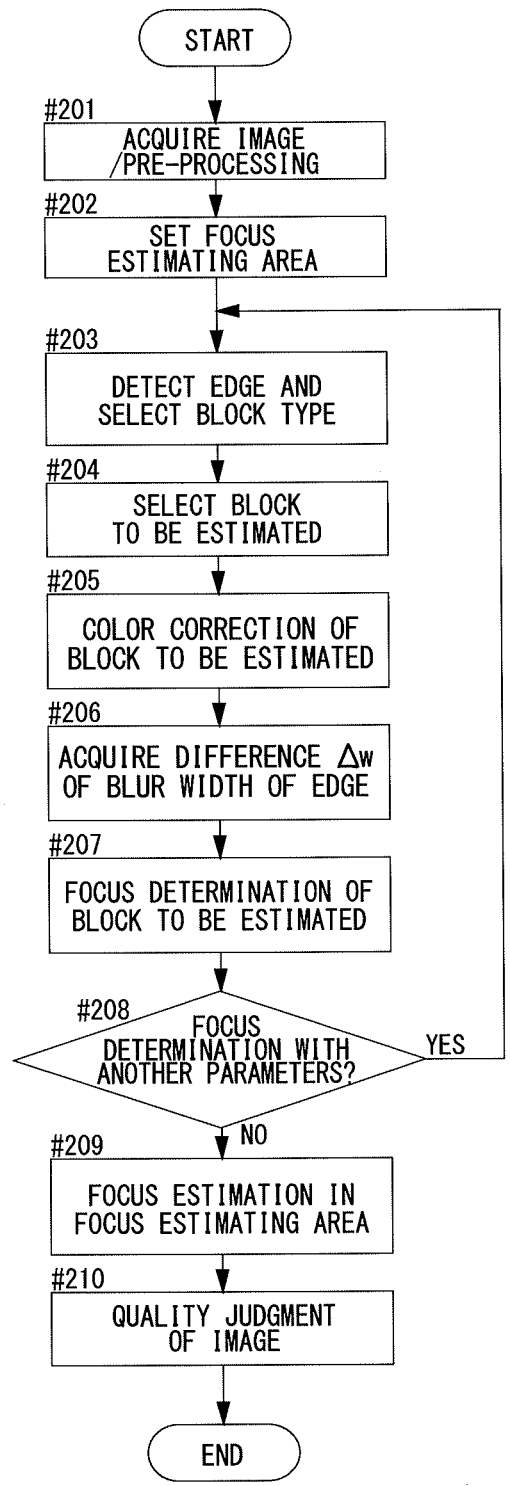
FIG. 12 is a flowchart illustrating an operation example of the focus estimating device of the second embodiment.

FIG. 12 is a flowchart illustrating an operation example of the focus estimating device of the second embodiment. Since processing at #201 to #209 in FIG. 12 corresponds to processing at #102 to #110 in FIG. 2, duplicated explanation will be omitted. At #201, it is assumed that the CPU 34 acquires a color image photographed by the electronic camera from the data reading unit 32. Then, at #210, the CPU 34 executes quality judgment of the image based on the focus estimation and displays the result on the monitor 39. The CPU 34 may automatically select a favorable image from among a plurality of color images in accordance with the result of the quality judgment of the image. In such second embodiment, too, the effect substantially similar to the first embodiment can be acquired.

Supplementary Matters of Embodiments (Supplement 1) In the above described embodiments, only the edge block in which both of the blocks adjacent in the gradient direction of the edge are flat blocks is handled as a block to be estimated. However, as described also at #105, as long as one of the blocks adjacent in the gradient direction of the edge is a flat block, the edge block may be used as a block to be estimated.

(Supplement 2) An example of weighting to the focus determination value in the above described embodiments is not limited to the examples in the above described (B1) to (B7). For example, if (condition 2) is not applied to #105 in the above embodiment (that is, a block including an uneven structure in the edge portion is not excluded from the block to be estimated), the focus estimating unit 25 may decrease the value of the weighting factor in the block to be estimated including the uneven structure in the edge portion.

(Supplement 3)

In the above embodiments, the example in which each function of the image processing device is realized by a program in a software manner is described. However, in the present invention, each of the functions of the area setting unit 21, the edge detecting unit 22, the block selecting unit 23, the focus determination unit 24, and the focus estimating unit 25 may be realized in a hardware manner by using ASIC.

(Supplement 4)

In the above described second embodiment, as an example of the focus estimating device which reads an image photographed by the electronic camera, a personal computer is described, but the focus estimating device in the second embodiment may be other electronic devices such as a photo viewer and a printer, for example.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A focus estimating device comprising:
an area setting unit setting an area in which focusing of an image is determined and dividing the area into a plurality of blocks;
a block selecting unit selecting a block to be used for focus determination:
a block focus determination unit performing focus determination for each block from an edge of each color component within the block selected by the block selecting unit; and
a focus determination unit determining focusing of the area based on the focus determination.

2. The focus estimating device according to claim 1, wherein
the block selecting unit selects a block which is adjacent to the block including a flat part and includes an edge.

3. The focus estimating device according to claim 2, wherein
when pixel values of adjacent pixels in each color in the block are differentiated and a ratio of the pixel having the difference at a first threshold value or less is acquired, the block including the flat part is a block having the ratio at a second threshold value or more.

4. The focus estimating device according to claim 1, wherein
the block selecting unit groups the blocks having a continuous edge.

5. The focus estimating device according to claim 1, wherein
the block selecting unit selects a block in which edge inclinations in two color components are in the same direction.

6. The focus estimating device according to claim 1, wherein
the block selecting unit excludes the block including an uneven structure in the edge from the selection.

7. The focus estimating device according to claim 6, wherein
the block including the uneven structure is a block including any one of a thin-line structure, a mountain-shaped structure and a valley-shaped structure.

8. The focus estimating device according to claim 1, wherein
the block selecting unit selects a block in which a difference in contrast generated at the edge is at a threshold value or more.

9. The focus estimating device according to claim 1, wherein
the block selecting unit selects a block in which a length of the edge is less than a threshold value.

10. The focus estimating device according to claim 1, wherein
the focus determination unit determines focusing of the area by applying weight-addition to at least either one of the focus determination result by a combination of the different color components and the focus determination result at different block sizes.

11. The focus estimating device according to claim 10, wherein
in the focus determination unit, the larger a difference in contrast at an edge is, the larger a value of weighting in the block is set.

12. The focus estimating device according to claim 10, wherein
in the focus determination unit, the smaller a blur width at an edge is, the larger a value of weighting in the block is set.

13. The focus estimating device according to claim 10, wherein
the focus determination unit determines a value of weighting in the block in accordance with a zoom position of a photographing optical system when the image is acquired.

14. The focus estimating device according to claim 10, wherein
the focus determination unit increases a value of weighting in the block when a color difference in two color components which acquire a difference in a blur width in at least one of the blocks adjacent to a gradient direction of the edge is lower than a threshold value.

15. The focus estimating device according to claim 10, wherein
in the focus determination unit, the larger the motion vector of the subject in the block is, the smaller a value of weighting in the block is set.

16. An imaging device comprising:
an imaging unit; and
the focus estimating device according to claim 1.

17. The focus estimating device according to claim 1, wherein the block focus determination unit obtains a blur width of a first edge of a first color and a blur width of a second edge of a second color and performs the focus determination based on the blur width of the first edge and the blur width of the second edge.

18. A focus estimating device comprising:
an area setting unit setting an area in which focusing of an image is determined and dividing the area into a plurality of blocks;
a block selecting unit selecting the block including an edge;
a block focus determination unit performing focus determination for each block from an edge of each color component within the block selected by the block selecting unit; and
a focus determination unit determining focusing of the area based on the focus determination.

19. The focus estimating device according to claim 18, wherein
the block selecting unit groups the blocks having a continuous edge.

20. The focus estimating device according to claim 18, wherein
the block selecting unit selects a block in which edge inclinations in two color components are in the same direction.

21. The focus estimating device according to claim 18, wherein
the block selecting unit excludes the block including an uneven structure in the edge from the selection.

22. The focus estimating device according to claim 21, wherein
the block including the uneven structure is a block including any one of a thin-line structure, a mountain-shaped structure and a valley-shaped structure.

23. The focus estimating device according to claim 18, wherein
the block selecting unit selects a block in which a difference in contrast generated at the edge is at a threshold value or more.

24. The focus estimating device according to claim 18, wherein the block selecting unit selects a block in which a length of the edge is less than a threshold value.

25. The focus estimating device according to claim 18, wherein
the focus determination unit determines focusing of the area by applying weight-addition to at least either one of the focus determination result by a combination of the different color components and the focus determination result at different block sizes.

26. The focus estimating device according to claim 25, wherein
in the focus determination unit, the larger a difference in contrast at an edge is, the larger a value of weighting in the block is set.

27. The focus estimating device according to claim 25, wherein
in the focus determination unit, the smaller a blur width at an edge is, the larger a value of weighting in the block is set.

28. The focus estimating device according to claim 25, wherein
the focus determination unit determines a value of weighting in the block in accordance with a zoom position of a photographing optical system when the image is acquired.

29. The focus estimating device according to claim 25, wherein
the focus determination unit increases a value of weighting in the block when a color difference in two color components which acquire a difference in a blur width in at least one of the blocks adjacent to a gradient direction of the edge is lower than a threshold value.

30. The focus estimating device according to claim 25, wherein
in the focus determination unit, the larger the motion vector of the subject in the block is, the smaller a value of weighting in the block is set.

31. An imaging device comprising:
an imaging unit; and
the focus estimating device according to claim 18.

32. The focus estimating device of claim 18, wherein the block focus determination unit obtains a blur width of a first edge of a first color and a blur width of a second edge of a second color and performs the focus determination based on the blur width of the first edge and the blur width of the second edge.

33. A non-transitory computer readable storage medium stores an image processing computer program causing a computer to execute:
setting an area in which focusing of an image is determined and dividing the area into a plurality of blocks;
selecting a block to be used for focus determination;
performing focus determination for each block from an edge of each color component within the selected block; and
determining focusing of the area based on the focus determination.

34. A non-transitory computer readable storage medium stores an image processing computer program causing a computer to execute:
setting an area in which focusing of an image is determined and dividing the area into a plurality of blocks;
selecting the block including an edge;
performing focus determination for each block from the edge of each color component within the selected block; and
determining focusing of the area based on the focus determination.

35. A focus estimating device comprising:
a computer processor that operates as:
an area setting unit setting an area in which focusing of an image is determined and dividing the area into a plurality of blocks;
a block selecting unit selecting a block to be used for focus determination:
a block focus determination unit performing focus determination for each block from an edge of each color component within the block selected by the block selecting unit; and
a focus determination unit determining focusing of the area based on the focus determination.

36. A focus estimating device comprising:
a processor;
an area setting unit, executed by the processor, setting an area in which focusing of an image is determined and dividing the area into a plurality of blocks;
a block selecting unit, executed by the processor, selecting a block to be used for focus determination:
a block focus determination unit, executed by the processor, performing focus determination for each block from an edge of each color component within the block selected by the block selecting unit; and
a focus determination unit, executed by the processor, determining focusing of the area based on the focus determination.

37. A focus estimating device comprising:
a computer processor that operates as:
an area setting unit setting an area in which focusing of an image is determined and dividing the area into a plurality of blocks;
a block selecting unit selecting the block including an edge;
a block focus determination unit performing focus determination for each block from an edge of each color component within the block selected by the block selecting unit; and
a focus determination unit determining focusing of the area based on the focus determination.

38. A focus estimating device comprising:
a processor;
an area setting unit, executed by the processor, setting an area in which focusing of an image is determined and dividing the area into a plurality of blocks;
a block selecting unit, executed by the processor, selecting the block including an edge;
a block focus determination unit, executed by the processor, performing focus determination for each block from an edge of each color component within the block selected by the block selecting unit; and
a focus determination unit, executed by the processor, determining focusing of the area based on the focus determination.

* * * * *